No. 892,691. PATENTED JULY 7, 1908.
E. L. SHARPNECK.
ROLLER BEARING.
APPLICATION FILED JULY 8, 1907.
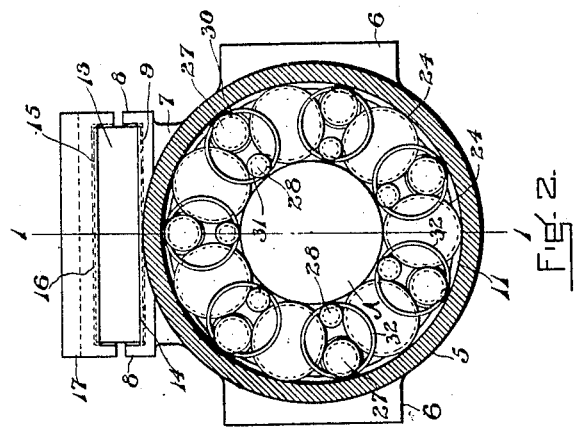
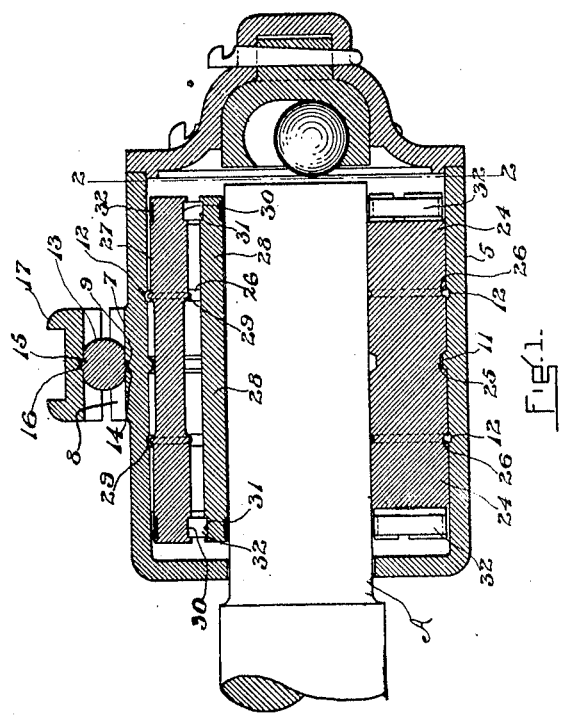
WITNESSES.
INVENTOR.

UNITED STATES PATENT OFFICE.

ELIEL L. SHARPNECK, OF WINTHROP, MASSACHUSETTS.

ROLLER-BEARING.

No. 892,691.　　　　Specification of Letters Patent.　　　　Patented July 7, 1908.

Application filed July 8, 1907. Serial No. 382,577.

*To all whom it may concern:*

Be it known that I, ELIEL L. SHARPNECK, of Winthrop, in the county of Suffolk and State of Massachusetts, have invented certain new and useful Improvements in Roller-Bearings; and I hereby declare that the following is a full, clear, and exact description of the same, reference being had to the accompanying drawings, forming part of this specification.

This invention has reference to roller bearings and particularly to such bearings designed for use in combination with car axle boxes or similar casings.

The object of the invention is to so construct a roller bearing that the separator devices for the anti friction rolls shall have rolling contact only with said anti friction rolls and with the connecting means of said separator rolls.

Another object of the invention is to reduce the friction on the anti friction rolls, so called.

Other objects of the invention will appear from the following description.

The invention consists in the separator rolls and in the peculiar means for supporting the same out of contact with the journaled shaft and with the race way.

The invention also consists in the combination with the roller bearing of the peculiar casing therefor.

The invention also consists in such other peculiar features of construction and combination of parts as shall hereinafter be more fully described and pointed out in the claims.

Figure 1, represents a sectional view of the improved roller bearing and its casing taken on line 1—1 Fig. 2. Fig. 2, represents a cross sectional view taken on line 2—2 Fig. 1.

Similar numbers of reference designate corresponding parts throughout.

In carrying this invention into practice I construct a casing, or box, which in its preferred form has the cylindrical wall 5 furnished on its exterior with the projections 6—6, the cross member 7 having the ends 8—8 and the groove 9. Internally the casing 5 is furnished with the annular rib 11 and with the grooves 12. Mounted on the member 7 of the casing 5, is the rocker 13 having the cross sectional shape shown in Fig. 1 and furnished on its flat surfaces with the ribs 14 and 15 which fit respectively, the groove 9 of the member 7, and the similar groove 16 of the saddle 17, whereby lateral pressure on said saddle is resisted by the leverage of the flat surfaces of the rocker 13 against the surfaces on which they bear.

Within the casing 5 are the anti friction rolls 24—24 which are free to rotate on their respective axes and to revolve, or travel, in the raceway formed by the inner surface of the casing, but longitudinal movement of which rolls is prevented by the engagement of their centrally located annular channels 25 with the rib 11 of said casing, while the grooves 26—26 in the peripheries of said rolls are designed to receive portions of the separating rolls. The anti friction rolls 24— 24 are designed to receive and rotatably support the shaft A and to freely rotate and revolve under the rotation of said shaft. In order that said anti friction rolls may maintain their relative positions without exerting undue frictional resistance thereon, I provide separating devices for said anti friction rolls which separating devices comprise pairs of rolls 27—28 located between adjacent pairs of anti friction rolls. The rolls 27—27 have annular ribs 29—29, engaged in the grooves 12—12 of the casing, and the grooves 26—26 of the rolls 24, and annular channels 30—30, near their ends, these rolls 27—27 being reduced in diameter between the ribs 29—29 to clear the rib 11 while the smaller rolls 28—28 have the peripheral channels 31—31. In the channels 30 and 31 of each pair of the rolls 27—28 is engaged a ring 32 of a cross sectional shape to fit said channels and of a diameter to hold said rolls in contact with the rolls 24—24 and out of contact with the casing 5 and with the shaft A, except so far as occasional contact of the ribs 29—29 with the edges of the grooves 12—12 of said casing may occur.

When the shaft A is operated, the rolls 24—24 will rotate about their own axes and revolve about the axis of the shaft A, the rolls 27 and 28 by reason of their frictional contact with the anti-friction rolls, will rotate independently and revolve with the rolls 24—24 and the rings 32 will be rotated by reason of their frictional contact with the rolls 27 and 28 and frictional resistance to the rotation of the rolls 24—24 and the shaft A will be practically eliminated by the free rotation of all the moving parts in unison.

Having thus described my invention I claim as new and desire to secure by Letters Patent.

1. A roller bearing comprising a cylindrical casing having an annular rib on its inner surface, a series of anti friction rolls having annular channels, engaged with said rib, and annular grooves, a series of pairs of separator rolls, arranged between the anti friction rolls, one of each pair of the separator rolls having annular ribs engaged in the annular grooves of the anti friction rolls, and rotatable means engaged with each pair of separator rolls, as described.

2. A roller bearing comprising a cylindrical casing having an annular rib and annular grooves, a series of anti friction rolls within the casing each having an annular channel, engaged with said rib, and annular grooves, a series of pairs of separator rolls arranged in pairs between the anti friction rolls one of each pair of which rolls has a reduced portion to clear said rib and a pair of annular ribs engaged in the grooves of the anti friction rolls and of the casing, and a series of rings each of which embraces a pair of said separator rolls and is free to rotate and revolve therewith.

In testimony whereof I affix my signature in presence of two witnesses.

ELIEL L. SHARPNECK.

Witnesses:
 H. J. MILLER,
 M. M. HARRINGTON.